(No Model.)
E. L. MEGILL.
FEED GAGE FOR PRINTING PRESSES.
No. 449,909. Patented Apr. 7, 1891.
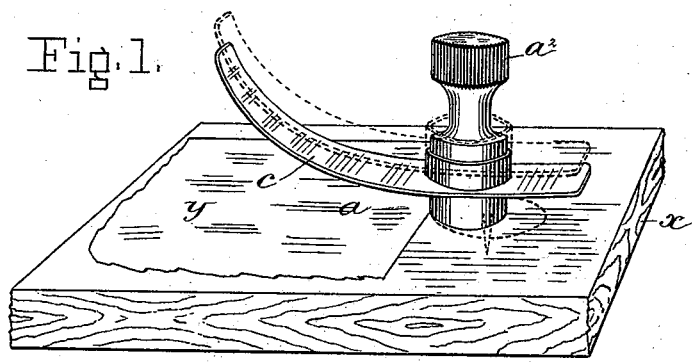
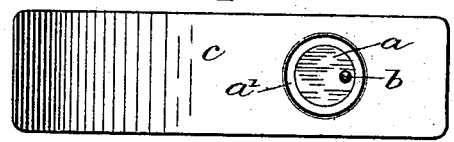
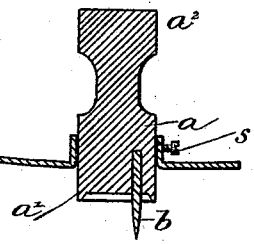
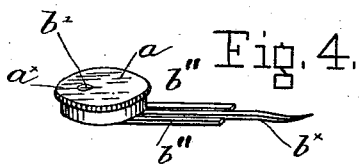
WITNESSES:
John A. Rennie
J. B. Caplinger
INVENTOR,
Edward L. Megill
By Henry Connett
Atty.

UNITED STATES PATENT OFFICE.

EDWARD L. MEGILL, OF BROOKLYN, NEW YORK.

FEED-GAGE FOR PRINTING-PRESSES.

SPECIFICATION forming part of Letters Patent No. 449,909, dated April 7, 1891.

Application filed July 29, 1889. Serial No. 319,026. (No model.)

*To all whom it may concern:*

Be it known that I, EDWARD L. MEGILL, a citizen of the United States, and a resident of Brooklyn, Kings county, New York, have invented certain Improvements in Feed-Gages for Printing-Presses, of which the following is a specification.

My invention relates to guides and gages for registering sheets fed to printing presses and machines. My gage is adapted to both cylinder and platen presses; and the object of the invention is to simplify the construction and to thus attain durability and economy, and to provide a gage that may be adjusted to the register with ease and accuracy. In whatever form it may be constructed to adapt it to presses of various kinds, my gage has one peculiar characteristic—namely, the gage-head is mounted rotatively and eccentrically to the axis of rotation—that is to say, the several parts of the curved gaging-surface, against which the sheet rests, are at different distances, measured radially, from the axis about which the head turns, and when the gage-head is turned more or less about its axis in either direction a different part of said surface will be brought to the gaging-point, thus changing the register. The gage-head is also circular in plan, by preference, and any portion of its periphery may be brought to the front to serve as a gage or guide. In the drawings I have shown my invention embodied in a gage to serve as a side guide for a cylinder-press, and also in a gage for a platen-press.

In the drawings, Figure 1 is a perspective view of a gage for a cylinder printing-press embodying my improvements. This view shows the gage attached to the feed-board as a side guide or gage. Fig. 2 is a plan of the gage as seen from the under side. Fig. 3 is a vertical axial section of the gage. Figs. 4 and 5 show my invention embodied in a gage suitable for platen-presses. Fig. 4 is a perspective view, and Fig. 5 is a sectional elevation.

The views illustrate two of the various forms in which my invention may be embodied.

I will first describe the gage illustrated in Figs. 1, 2, and 3. In Fig. 1, $x$ represents a part of the feed-board of a cylinder-press, and $y$ a sheet thereon, placed to register. The gage, which is represented as constructed and set in the feed-board as a side guide for the lateral register of the sheet $y$, consists of a cylindrical gage-head $a$, provided at its base with a spur $b$, set eccentrically in the head $a$ and adapted to be driven into the feed-board to serve as a fastening device and as a center for the head to turn on. A recess is formed in the base of the head $a$, leaving a sharpened rim $a'$ to sink into the board or fit down closely thereto, so that the sheet $y$ cannot pass under the head. The gage-head is furnished with a milled head $a^2$, whereby the pressman may conveniently rotate the head for adjustment of the register. On the cylindrical gage-head is a finger $c$, which has a sleeve that fits the head snugly, but may be rotated thereon or slipped up or down thereon. This finger keeps the sheet down near to the board, so that its edge must rest fairly against the head $a$. The dotted lines in Fig. 1 show this finger in an elevated position. By turning the gage-head on the spur $b$ as a center the register may be varied at will within limits, and the adjustment may be effected by the pressman at arm's length, if necessary. The curved dotted line on the board $x$ in Fig. 1 indicates the circle traversed by the gage-head in turning about the spur $b$ as a center.

As a gage for the front edge of the sheet, and particularly as a gage for platen-presses, I employ the construction shown in Figs. 4 and 5. In this form of gage the gage-head $a$ is a low or flat disk, which is eccentrically mounted on an attaching-prong $b^x$ through the medium of a stud $b'$. The head has a milled flange $a^x$, which serves as a means of facilitating the rotation of the head in adjusting it, and as a stripper for the sheets when the gage is used as a front guide or stop. This gage-head has a rim $a'$ to press upon the platen, and the head is set inclined to the surface of the platen, so that the edge next to the sheet that is being fed may bear firmly on the platen. To steady the gage-head the prong $b^x$ is cut from a plate in such a manner as to leave two fingers $b''$, one at each side of the prong, as seen in Fig. 4, to bear upon the sheet that covers the platen after the prong has been passed through and under said sheet.

I do not limit myself to the prong $b^x$ as a means of attachment to the sheet on the platen, as other means of securing a feed-gage to the platen are known.

In carrying out my invention it is only necessary, so far as this last-described form of the gage is concerned, that the gage-head shall be rotatively and eccentrically mounted on a base that is adapted to be secured to the platen.

In the form illustrated in Figs. 1, 2, and 3 the construction is the same in principle as that last described, but in it the base of the guide forms a part of the printing-press as well as a part of the gage.

The gage-head shown in Figs. 1, 2, and 3 may be set inclined to the bed, the same as that shown in Figs. 4 and 5. This may be effected by setting the spur $b$ into the board $x$ inclined. The finger $c$ may be secured in place after setting it by a set-screw $s$. (Seen in Fig. 3.) This adjustable finger may be raised or lowered or turned laterally about the gage-head, which renders it very convenient for the press-feeder.

Having thus described my invention, I claim—

1. A sheet-registering gage provided with an eccentric for adjusting the position of its registering-face.

2. A feed gage or guide having an eccentrically-adjustable rotative gage-head, said head being provided with an attaching pin or spur at its base.

3. A feed gage or guide having a rotative cylindrical head provided with an attaching-spur $b$, set eccentrically in its base, and with a finger $c$, mounted rotatively on said head.

4. A feed gage or guide having a rotative gage-head provided with an attaching-spur set eccentrically in its base, and with a finger $c$, mounted rotatively on the cylindrical portion of said head, the finger $c$ being also capable of vertical adjustment on said head.

5. A feed gage or guide having a cylindrical gage-head $a$ rotatively and eccentrically mounted and provided with a milled head or portion $a^2$, substantially as set forth.

6. A sheet-registering gage having a gage-head adapted to turn about a pivot, said gage-head having a curved gaging-face eccentric to said pivot, substantially as set forth.

In witness whereof I have hereunto signed my name in the presence of three subscribing witnesses.

EDWARD L. MEGILL.

Witnesses:
HENRY CONNETT,
H. W. HELFER,
J. D. CAPLINGEN.